United States Patent Office 3,444,140
Patented May 13, 1969

3,444,140
PRESSURIZED ESTERIFICATION OF TEREPH-
THALIC ACID IN PRESENCE OF LOW CON-
CENTRATION OF TERTIARY AMINE
Mary J. Stewart, Media, and Otto K. Carlson, Marcus
Hook, Pa., assignors to FMC Corporation, Philadelphia,
Pa., a corporation of Delaware
No Drawing. Filed Nov. 14, 1966, Ser. No. 593,685
Int. Cl. C08g 17/003
U.S. Cl. 260—75                                     4 Claims

ABSTRACT OF THE DISCLOSURE

Process of preparing polyethylene terephthalate comprising carrying out a direct esterification reaction between terephthalic acid and ethylene glycol, wherein the molar ratio of ethylene glycol to terephthalic acid is from about 1.1:1 to less than 2:1 in the presence of a very low concentration of a volatile tertiary amine under superatmospheric pressure and then polycondensing the resulting product.

---

This invention relates to an improved method for preparing a linear polyester which is essentially the condensation product of a dicarboxylic acid and diol, and more particularly, to an improved method of preparing polyethylene terephthalate having excellent filament-forming properties.

The manufacture of polyester resin from a dicarboxylic acid and a diol is well-known in the art. Generally, in the preparation of such polyesters, a dicarboxylic acid and diol are first combined and subjected to a direct esterification reaction in the presence of a first stage catalytic additive or ether inhibitor. The resulting product or preploymer is then polycondensed in the presence of a polycondensation catalyst to form the polyester resin. However, this process has achieved only limited commercial success due to the fact that the reaction proceeds relatively slow and is generally accomplished with the formation of large quantities of diethylene glycol and similar ethers which tend to become part of the polyester chain in the form of aliphatic ether linkages. Such modifications of the polyester chain results in the formation of a polymer which is not generally suitable for fiber production due to its susceptibility to heat and hydrolytic action.

Various combinations of first stage catalytic additives and polycondensation catalysts have been suggested heretofore for use in the direct esterification method of preparing polyethylene terephthalate wherein ethylene glycol and terephthalic acid are first esterified to form a polyester prepolymer consisting of bis-2-hydroxyethyl terephthalate in combination with polycondensation products thereof wherein the D.P. (degree of polymerization) varies from about 2 to about 6, and in the second stage or polycondensation step wherein the product of esterification is poly condensed. However, in general, none of these have proven entirely satisfactory because of problems of ether formation in the polymer chain, and prolonged reaction time required.

Among the first stage additives or ether inhibitors that have been used are, for example, sodium acetate and calcium acetate.

From a commercial standpoint, it is essential that a polyester resin be produced in the shortest possible time and the desired degree of polymerization be obtained. A polyethylene terephthalate resin suitable for fiber forming should have a carboxyl content value of below 50 equivalents per million grams (eq./10$^6$ gr. meq./kg.), a birefringent melting point of about at least 258–260° C., a diethylene glycol content of less than 1% by weight, and an intrinsic viscosity preferably not less than about 0.60 (as determined in a 60% phenol and 40% tetrachloroethane solution, wt./wt., at 30° C.), in order for the resulting fibers to possess a satisfactory level of hydrolytic and heat stability, ultra-violet stability, and a high degree of tenacity.

It is an object of this invention to prepare polyethylene terephthalate suitable for melt spinning non-degraded, processable filaments by a direct esterification reaction between terephthalic acid and ethylene glycol.

Another object of the present invention is to provide an improved method for the production of filament-forming polyethylene terephthalate having a low ether content and a high intrinsic viscosity through the use of a minimum amount of a direct esterification catalytic additive.

These and other objects are accomplished in accordance with the present invention which involves a method for preparing filament-forming polyethylene terephthalate comprising carrying out a direct esterification reaction between terephthalic acid and ethylene glycol in the presence of a volatile tertiary amine wherein the molar ratio of ethylene glycol to terephthalic acid is from about 1.1:1 to less than 2:1 and the molar ratio of volatile tertiary amine to terephthalic acid is from about 0.01:1 to less than 0.05:1, under superatmospheric pressure to form a polyester prepolymer and then polycondensing the resulting polyester prepolymer in the presence of a polycondensation catalyst.

The present invention may be carried out in either a stepwise batch process or in a continuous process in view of the rapidity of the direct esterification step of the present method. In the practice of the present invention, the ratio of ethylene glycol to terephthalic acid that can be employed in the reaction mixture is from about 1.1:1 to less than 2:1. However, in most instances it has been found that the preferred ratio of ethylene glycol to terephthalic acid is from 1.2:1 to about 1.7:1 in view of the ease of handling, speed of reaction and improved polyester product obtained.

The ratio of volatile tertiary amine to terephthalic acid utilized in the present method is from about 0.01:1 to less than 0.05:1. The use of such a low concentration of tertiary amine as a first stage additive in the present method of preparing filament-forming polyester resin is very desirable and advantageous for several reasons. With the use of such low concentrations of a first stage additive, a polyester resin product is obtained which is characterized by its improved color, and thermal and hydrolytic stability. This is partially due to the fact that the polyester products of the present method contain a very low residual amount, if any, of the first stage additive used. Also, obviously with the use of such a low concentration of first stage additive, there is obtained a cost benefit.

The volatile tertiary amines which are suitable for use as first stage additives in the present method may be described as trialkylamines having up to six carbon atoms per alkyl radical. Examples of such amines are trimethylamine, triethylamine, tripropylamine, triisopropylamine, tri-n-butylamine, triamylamine, trihexylamine, dimethylhexylamine, and dimethylisopropylamine.

In general, the first stage of the present method is carried out under superatmospheric pressure within the range of from about 40 p.s.i. to about 100 p.s.i. in the absence of an oxygen containing gas at a temperature from about 220° C. to about 290° C. However, it has been found that the preferred range of pressure and temperature for conducting this portion of the reaction is from about 50 p.s.i. to about 70 p.s.i. at from about 240° C. to about 260° C. in view of the optimum rate of reaction achieved and improved polyester product obtained.

According to the present process, when the first stage reaction mixture appears as a clear melt, the superatmospheric pressure is released. Then, the resulting reaction mixture is further heated at a temperature of from about 220° C. to about 290° C. at atmospheric pressure for another 15–30 minutes in the absence of an oxygen containing gas in order to remove any by-product water that has formed, remove any unreacted glycol that is present, remove the volatile tertiary amine from the reaction mixture, and drive the direct esterification reaction to completion. After distilling off the water, glycol, and tertiary amine from the reaction mixture, the resulting polyester prepolymer is then polycondensed in the presence of a conventional polycondensation catalyst at a tempearture of from about 260° C. to about 325° C. at reduced pressure of from about 0.05 to 20 mm. of mercury from about two to five hours in the absence of an oxygen containing gas to form a polyester resin. The direct esterification step of the present method is carried out in an inert atmosphere, for example, under a sparge of nitrogen or other inert gas.

Among the conventional polycondensation catalysts that can be used are, for example, antimony trioxide, and the like. The polycondensation catalyst may be added to the present reaction mixture before initiating the first step or direct esterification reaction between ethylene glycol and terephthalic acid or after the reaction product thereof is formed. The polycondensation catalysts are generally employed in concentrations ranging from about 0.005 to about 0.5%, based on the total weight of reactants.

The following examples of several preferred embodiments will further serve to illustrate the preesnt invention. All parts are by weight unless otherwise indicated.

Example I

A blend of 166 grams terephthalic acid (1.0 mole), 95 mls. of ethylene glycol (1.7 moles), and 5.6 mls. of triethylamine (0.04 mole) was charged into a Fischer-Porter pressure reactor assembly equipped with a nitrogen sparge tube and a distilling arm. The reactor was lowered into an oil bath at 260° C. and flushed for about ten minutes with dry nitrogen. Then a nitrogen pressure of 60 p.s.i. was applied. When a clear melt was obtained (in about 180 minutes) the pressure was reduced to atmospheric and by-product water and excess glycol were distilled off at 260° C. over a period of thirty minutes. The resulting polyester prepolymer was cooled under a nitrogen atmosphere. The prepolymer had a carboxyl content value of 362 (meq./kg.) indicating that the esterification reaction had proceeded to 96% completion.

Example II 50 grams of the polyester prepolymer of Example I was mixed with 0.02 g. of antimony trioxide and placed in a reaction vessel. The reaction mixture was heated at about 282° C. for three hours and under reduced pressure of from about 0.05 mm. to about 0.1 mm. of mercury while under agitation to bring about the polycondensation of the prepolymer of Example I and formation of a polyester resin product. The resulting polyester resin had an intrinsic viscosity of 0.93, a carboxyl content value of 10.9 (meq./kg.), a melting point of about 265° C. and a diethylene glycol content of 0.96% (by weight). The resulting product was very pale tan-white in color.

Example III

A blend of 166 g. of terephthalic acid (1 mole), 67 mls. of ethylene glycol (1.2 moles), 1.4 mls. of triethylamine (0.01 mole) was charged into a Fischer-Porter pressure reactor assembly equipped with a nitrogen sparge tube and a distilling arm. The reactor was lowered into an oil bath at 260° C. and flushed for about ten minutes with dry nitrogen. Then a nitrogen pressure of 60 p.s.i. was applied. When a clear melt was obtained (in about 340 minutes) the pressure was reduced to atmospheric and by-product water and excess glycol were distilled off at 260° C. over a period of thirty minutes. The resulting polyester prepolymer was cooled under a nitrogen atmosphere. The prepolymer had a carboxyl content value of 1084 (meq./kg.), indicating that the esterification reaction had proceeded to 88% completion.

Example IV 50 grams of the polyester prepolymer of Example III was mixed with 0.02 g. of antimony trioxide and placed in a reaction vessel. The reaction mixture was heated at about 282° C. for three hours under reduced pressure of from about 0.05 mm. to about 0.1 mm. of mercury while under agitation to bring about the polycondensation of the prepolymer of Example III and formation of a polyester resin product. The resulting polyester resin had an intrinsic viscosity of 0.96, a carboxyl content value of 21.4 (meq./kg.), a melting point of about 263° C. and a diethylene glycol content of 0.85% (by weight). The polyester resin product had a very pale gray-white color.

Example V

A blend of 166 g. of terephthalic acid (1 mole), 95 mls. of ethylene glycol (1.7 moles), and 7.6 mls. of tripropylamine (0.04 mole) was charged into a Fischer-Porter pressure reactor assembly equipped with a nitrogen sparge tube and a distilling arm. The reactor was lowered into an oil bath at 260° C. and flushed for about ten minutes with dry nitrogen. Then a nitrogen pressure of 60 p.s.i. was applied. When a clear melt was obtained (in about 180 minutes), the pressure was reduced to atmospheric and by-product water and excess glycol were distilled off at 260° C. over a period of thirty minutes. The resulting polyester prepolymer was cooled under a nitrogen atmosphere. The prepolymer had a carboxyl content value of 693 (meq./kg.), indicating that the esterification reaction had proceeded to 92% completion.

Example VI 50 grams of the polyester prepolymer of Example V was mixed with 0.02 g. of antimony trioxide and placed in a reaction vessel. The reaction mixture was heated at about 282° C. for three hours under reduced pressure of from about 0.05 mm. to about 0.1 mm. of mercury while under agitation to bring about the polycondensation of the prepolymer of Example V and formation of a polyester resin product. The resulting polyester resin had an intrinsic viscosity of 1.03, a carboxyl content value of 13.5 (meq./kg.), a melting point of about 264° C., and a diethylene glycol content of 0.64% (by weight). The polyester resin product was very pale off-white in color.

The intrinsic viscosities of the polyester resin products in the examples above were determined in a 60% phenol and 40% tetrachloroethane solution (wt./wt.) at 30° C.

The results in the examples above indicate that the present method, in general, facilitates the preparation of and improves the polyester prepolymer formed and in turn the polyester resin product. Through the use of the present method, the direct esterification reaction time is reduced over the methods of the prior art and polyester products are obtained which are characterized by their high molecular weight, as indicated by their intrinsic viscosity, low carboxyl content, low diethylene glycol content, high melting point, and excellent color.

While the process of the present invention has been described with particular reference to polyethylene terephthalate, it will be obvious that the subject invention includes within its scope the preparation of other polymeric polymethylene terephthalates. For example, it includes within its scope other polymeric polymethylene terephthalates formed from glycols of the series $$HO(CH_2)_nOH$$

wherein $n$ is 2 to 10 and terephthalic acid and copolyesters containing varied amounts of other suitable dicarboxylic acids such as isophthalic acid.

We claim:

1. A method for preparing filament-forming polyethylene terephthalate resin comprising carrying out a direct esterification reaction between terephthalic acid and ethylene glycol in the presence of a volatile trialkylamine esterification additive, wherein the molar ratio of ethylene glycol to terephthalic acid is from 1.1:1 to less than 2:1 and the molar ratio of trialkylamine to terephthalic acid is fro mabout 0.01:1 to less than 0.05:1, at a temperature between about 220° C. to about 290° C. under superatmospheric pressure within the range of about 40 p.s.i. to 100 p.s.i. in the absence of an oxygen containing gas until the reaction mass appears as a clear melt, then releasing the superatmospheric pressure and heating the reaction mass at atmospheric pressure at a temperature of about 220° C. to 290° C. in the absence of an oxygen containing gas to remove any by-product water, unreacted glycol, and said trialkylamine, to form a polyester prepolymer and then polycondensing the resulting said polyester prepolymer under reduced pressure at a temperature range from about 260° C. to about 325° C. in the presence of a polycondensation catalyst.

2. The method of claim 1 wherein the molar ratio of ethylene glycol to terephthalic acid is from about 1.2:1 to about 1.7:1.

3. The method of claim 1 wherein the volatile tertiary amine is triethylamine.

4. The method of claim 1 wherein the volatile tertiary amine is tripropylamine.

References Cited

UNITED STATES PATENTS 3,060,152  10/1962  Ringwald.
3,185,670  5/1965  McKinney.

WILLIAM H. SHORT, *Primary Examiner.*

L. P. QUAST, *Assistant Examiner.*

U.S. Cl. X.R.

260—475

UNITED STATES PATENT OFFICE
CERTIFICATE OF CORRECTION

Patent No. 3,444,140  May 13, 1969

Mary J. Stewart et al.

It is certified that error appears in the above identified patent and that said Letters Patent are hereby corrected as shown below:

Column 1, line 57, "poly condensed" should read -- polycondensed --; line 69, insert -- or -- between gr. and meg./kg. Column 3, line 30, "preesnt" should read -- present --; line 54, cancel "and". Column 5, line 8, "fro mabout" should read -- from about --.

Signed and sealed this 23rd day of June 1970.

(SEAL)
Attest:

Edward M. Fletcher, Jr.

Attesting Officer

WILLIAM E. SCHUYLER, JR.

Commissioner of Patents